United States Patent
Krueger

[11] Patent Number: 6,021,594
[45] Date of Patent: Feb. 8, 2000

[54] BIG GAME DECOY

[76] Inventor: Wayne C. Krueger, 18242 Tulane St., Forest Lake, Minn. 55025

[21] Appl. No.: 09/089,114
[22] Filed: Jun. 2, 1998
[51] Int. Cl.$^7$ .................................................. A01M 31/06
[52] U.S. Cl. ................................................ 43/2; 446/331
[58] Field of Search .............................. 43/1–3; 446/331, 446/490; 40/411, 420, 421

[56] References Cited

U.S. PATENT DOCUMENTS

| | | | |
|---|---|---|---|
| 1,570,332 | 1/1926 | Brown | 40/421 |
| 1,628,331 | 5/1927 | Pence et al. | 40/421 |
| 1,666,018 | 4/1928 | Mayette | 40/421 |
| 1,679,755 | 8/1928 | Warren | 40/421 |
| 2,174,211 | 9/1939 | Hutaff, Jr. | 43/3 |
| 2,421,279 | 5/1947 | Marty | 446/331 |
| 2,453,646 | 11/1948 | Tomlin et al. | 446/331 |
| 2,455,430 | 12/1948 | Luckhaupt | 446/331 |
| 2,457,295 | 12/1948 | Woodhead | 43/3 |
| 2,663,108 | 12/1953 | Dixon et al. | 43/3 |
| 2,765,583 | 10/1956 | Gamble | 40/420 |
| 2,821,801 | 2/1958 | Pruitt, Sr. | 40/420 |
| 3,927,485 | 12/1975 | Thorsnes, Jr. | 43/3 |
| 4,773,178 | 9/1988 | Marek . | |
| 4,821,444 | 4/1989 | Remus . | |
| 4,852,288 | 8/1989 | Payne et al. . | |
| 4,965,953 | 10/1990 | McKinney | 43/2 |
| 5,168,649 | 12/1992 | Wright | 43/2 |
| 5,231,780 | 8/1993 | Gazalski | 43/3 |
| 5,274,942 | 1/1994 | Lanius | 43/2 |
| 5,335,438 | 8/1994 | Terrill . | |
| 5,375,363 | 12/1994 | Higdon | 43/3 |
| 5,522,168 | 6/1996 | Friddle | 43/2 |
| 5,546,692 | 8/1996 | Byers . | |
| 5,632,110 | 5/1997 | Roy | 43/2 |
| 5,791,081 | 8/1998 | Turner | 43/2 |

Primary Examiner—Michael J. Carone
Assistant Examiner—Darren W. Ark
Attorney, Agent, or Firm—Mackall, Crounse & Moore, PLC

[57] ABSTRACT

A four-legged female wild game decoy for attracting like male game on the ground includes a vertical support, which may simulate a forward leg, mountable to the ground. A body is pivotally mounted to the vertical support and is appropriately biased in a substantially upright horizontal posture. The body has a rear hip portion supporting a pivotally mounted tail and a foldable rear leg suspended therefrom. A body posture adjustment mechanism is provided for raising the tail and lowering the hip portion to simulate a squatting urination posture for the game decoy.

7 Claims, 3 Drawing Sheets

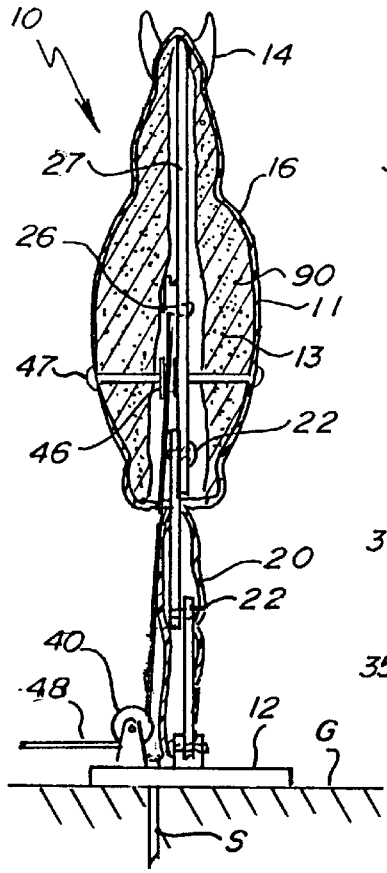
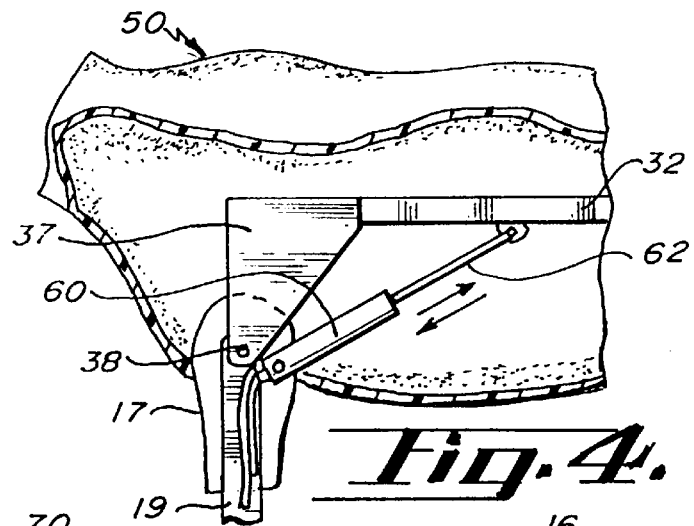
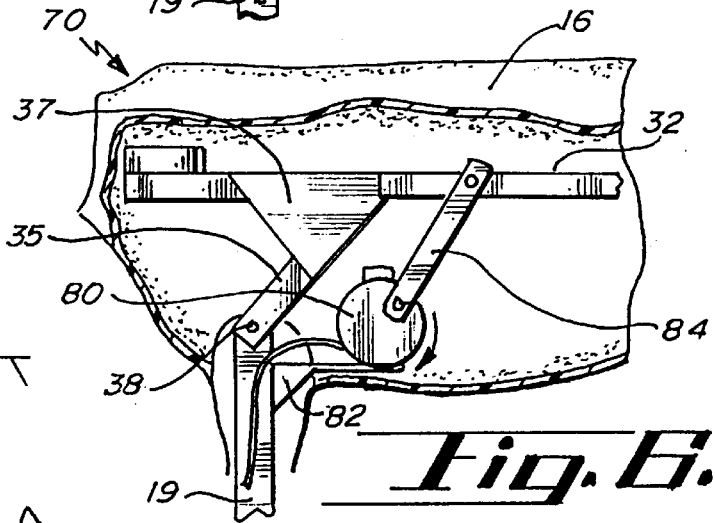
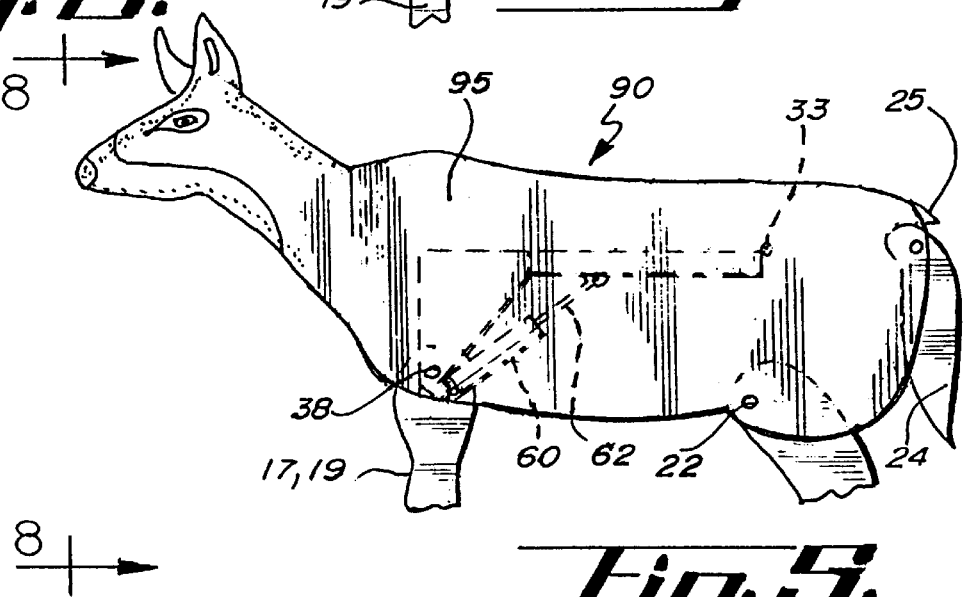

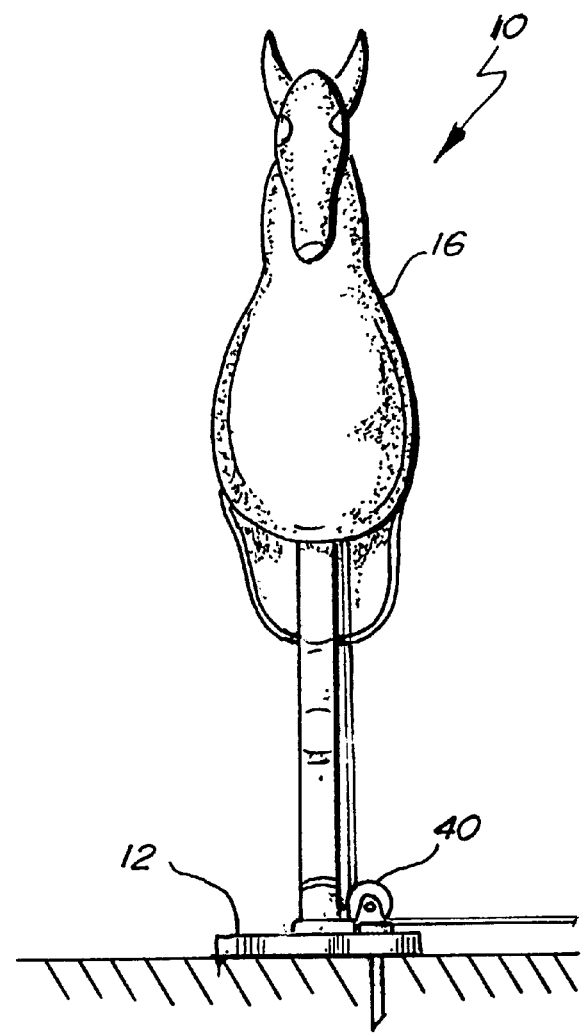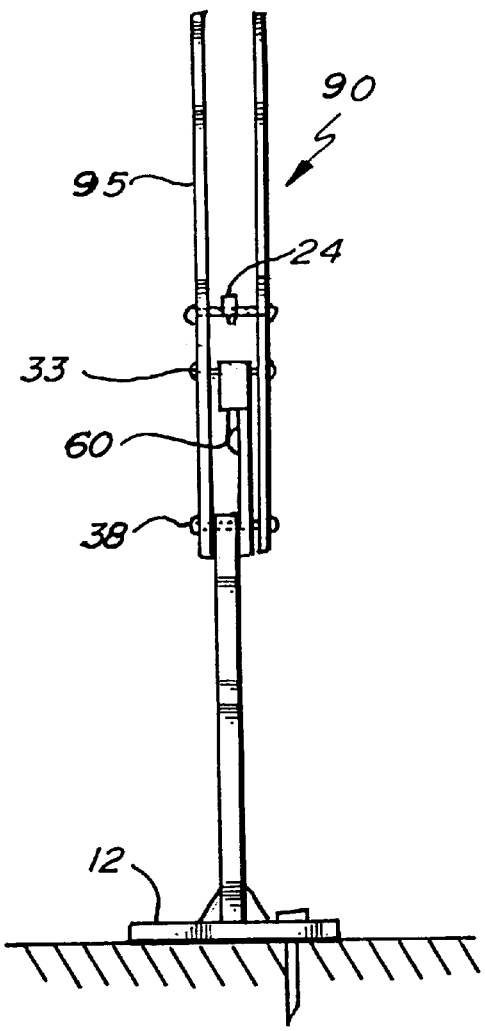

BIG GAME DECOY

BACKGROUND OF THE INVENTION

This invention relates to watching, photographing and hunting of four-legged wild game, and more particularly, to a four-legged female wild game decoy for attracting like male wild game.

Four-legged wild game, such as deer, elk, moose, etc., are quite elusive and immediately run away from the scent or noticed presence of humans. Thus, such wild game are difficult to locate for watching, photographing or hunting by the sportsman or hunter.

Both male and female wild game decoys have been used for attracting the wild game but have met with limited success. The reason for this is simple in that the decoys are much like statues and are completely immobile with respect to their bodies, heads, limbs and tails. Many also do not appear life-like.

It is well known that during the mating or rut season in the fall, hunters will often utilize female game decoys to attract bucks and bulls. However, the male wild game become suspicious as the decoy provides no real life movement. Scent attractants comprised of female estrus urine from the wild game have also been utilized to attract the males of the species. However, scent attractants have also met with limited success in that the scent travels downwind and the male wild game similarly becomes suspicious when they do not see the actual female wild game animal.

Applicant has discovered that most four-legged female wild game squat when they urinate. Also, when wild female game are receptive to breeding, they will lift their tail upwardly and to a substantially horizontal position. During the rut or mating season, the male species of the wild game will come running on approach to the immediate location rearward of the female during and after urination for the male animal to smell and determine if the female is ready or receptive for mating. This squatting of the female wild game and lifting of the tail have consistently shown to most faithfully attract the male wild game to be watched, photographed or hunted.

There is a need for a mechanical four-legged female wild game decoy that can simulate urination posture of the female animal and similarly will lift the tail from its downward hanging position to an upward substantially horizontal and outward position indicating receptiveness to breeding.

SUMMARY OF THE INVENTION

A four-legged female wild game decoy for attracting like male game on the ground includes a vertical support, which may simulate a forward leg, mountable to the ground. A body is pivotally mounted to the vertical support and is appropriately biased in a substantially upright horizontal posture. The body has a rear hip portion supporting a pivotally mounted tail and a foldable rear leg suspended therefrom. A body posture adjustment mechanism is provided for raising the tail and lowering the hip portion to simulate a squatting urination posture for the game decoy.

A principal object and advantage of the present invention is that the decoy has a remotely operated tail which lifts to animate that the wild game is receptive for mating, thereby attracting the male species of the game for hunters.

Another principal object and advantage of the present invention is that the game decoy is mechanical in nature and is remotely movable from a substantially upright horizontal posture to a lowered rear hip portion to simulate a squatting urination posture of the female game decoy to attract the like male wild game.

Another principal object and advantage of the present invention is that the mechanical four-legged female game deer decoy may be operated by several mechanisms to adjust the posture and tail position of the decoy.

Another object and advantage of the present invention is that it is uniquely simple in mechanical design rendering its construction cost efficient, economical and reasonably priced for all hunters, animal watchers and photographers to easily acquire.

Another object and advantage of the present invention is that the decoy's body can be made flat sided as a silhouette or round sided as a three dimensional body.

Another object and advantage of the present invention is that the decoy can be made as a white tail deer, black tail deer, mule deer, antelope, moose and elk.

Another object and advantage of the present invention is that the decoy's tail can be moved without the decoy squatting. This is an attention getter.

Another object and advantage of the present invention is that the decoy can be made to squat after the lifting of the tail. This is an attractant.

Another object and advantage of the present invention is that the decoy, being life size, can be seen from great distances.

Another object and advantage of the present invention is that the decoy user can remotely operate the decoy from a tree stand or ground blind.

Another object and advantage of the present invention is that the decoy uses appearance and body language for attracting the male big game animal.

Another object and advantage of the present invention is that the decoy is completely mobile for moving from place to place.

Another object and advantage of the present invention is that the decoy can be used statue like with no moving body parts or with moving body parts for attracting game.

Another object and advantage of the present invention is that the decoy's body language (tail and squatting movement) is a totally new innovation in big game decoying.

BRIEF DESCRIPTION OF THE DRAWINGS

FIG. 2 is a rear elevational view taken along lines 2—2 of FIG. 1 with the body of the decoy partially broken away;

FIG. 4 is a second embodiment of the decoy partially broken away to show an alternate body posture adjustment mechanism.

FIG. 5 is a side elevational view of a third female wild game decoy embodiment that is two dimensional, unlike the three dimensional sculptured or 3D decoy of FIGS. 1 and 2.

FIG. 6 shows yet another third embodiment of the wild game decoy with yet another body posture adjustment means comprised of a motor and an offcentrically mounted link for lowering the body.

FIG. 7 is a front elevational view of the female wild game decoy of FIG. 1.

FIG. 8 is a front elevational view of the embodiment of FIG. 5 taken along lines 8—8 of FIG. 5.

DETAILED DESCRIPTION

Figure 1:
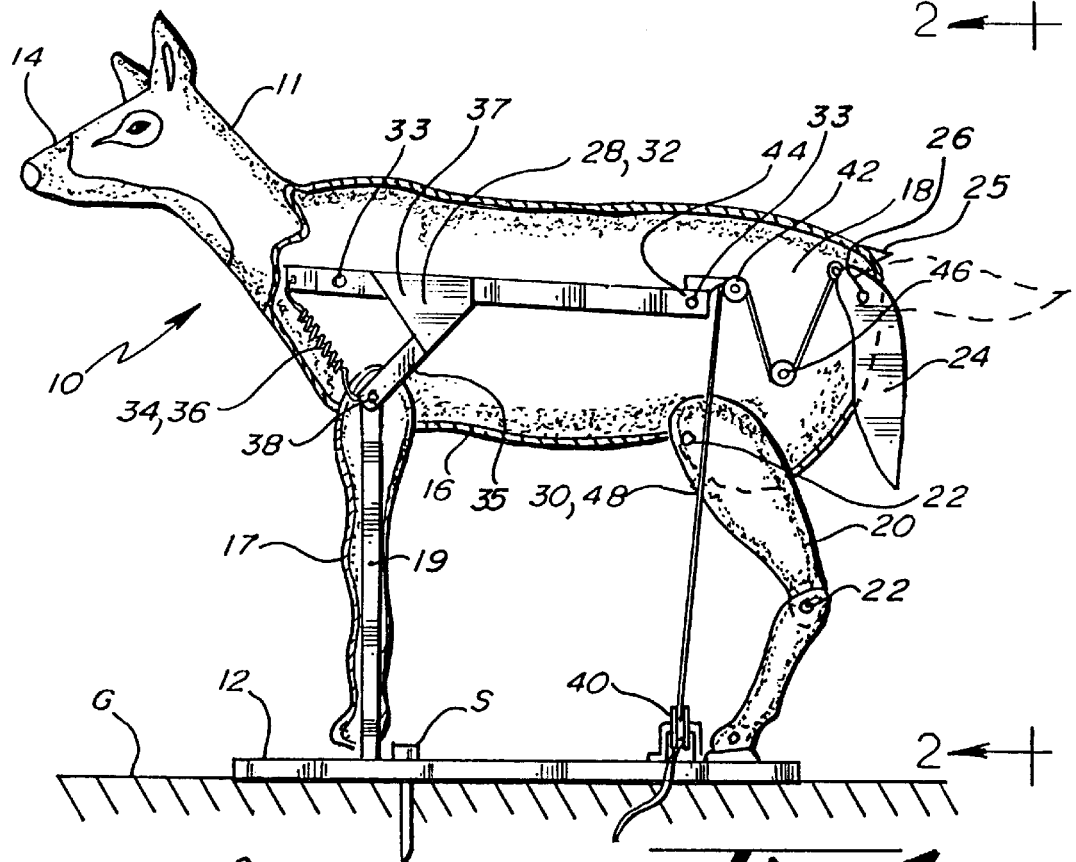
FIG. 1 is a partially broken away side elevational view of the four-legged female wild game decoy of the present invention.
Figure 3:
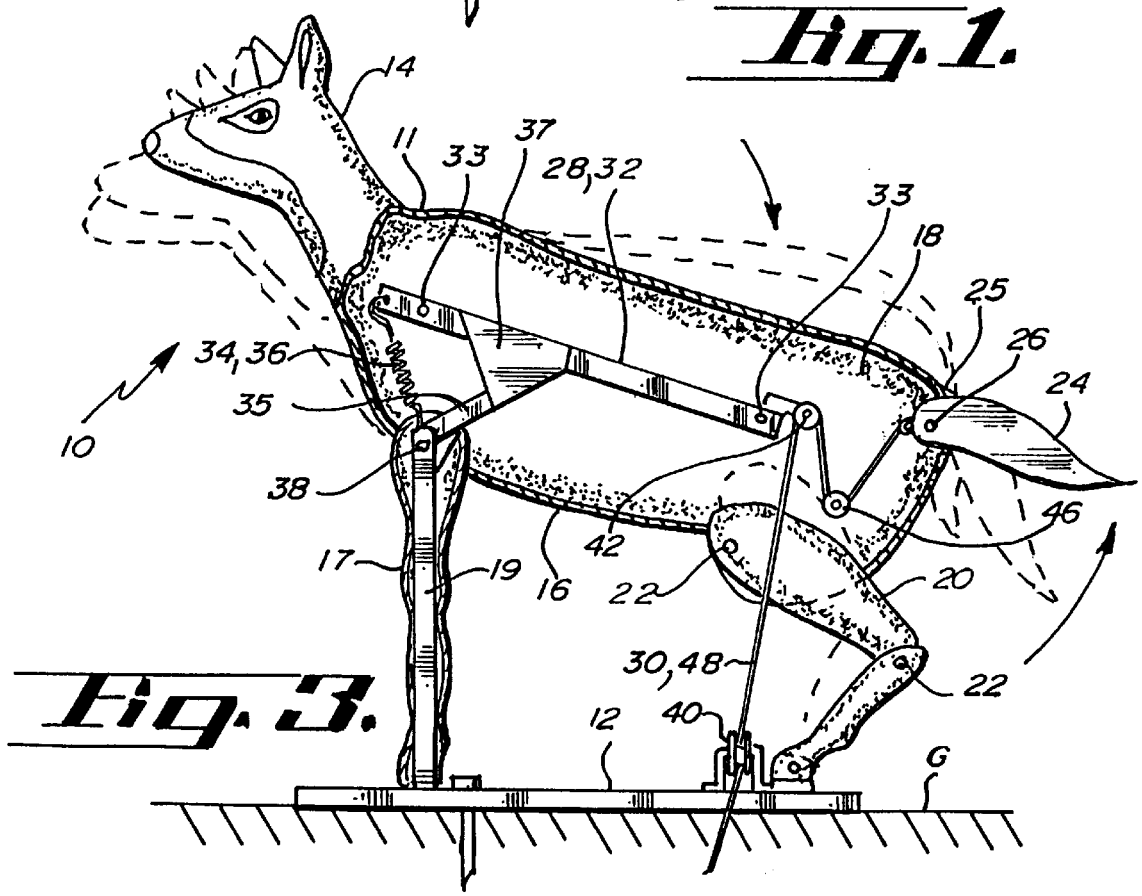
FIG. 3 is a side elevational view similar to FIG. 1 with the body posture adjustment means actively raising the pivotally mounted tail and lowering the rear hip portion of the body to simulate urination posture.

The four-legged female wild game decoy 10 of the present invention may generally be seen in its various embodiments in FIGS. 1 through 8. The game decoy 10 is generally comprised of a body 16 supporting a head 14 with a hip rear portion 18 supporting a pivotally mounted tail 24. Front legs 17 are coextensive with vertical support 19. Foldable rear legs 22 are suspended from the body 16. Body posture adjustment means 28 and 30 are provided for remotely raising the tail 24 and lowering the rear hip portion to simulate receptiveness to mating and the urination posture of female wild game.

Referring more specifically to FIG. 1 through 3 and 7, the three dimensional four-legged female game decoy 10 of the present invention may be understood. The decoy 10 has an outer removable skin 11 surrounding foam 13 to give the decoy 10 a life-like sculptured appearance. A base 12 is provided suitably positioned on the ground G suitably where it is desired to attract the male wild game of the desired species. One or more spikes S may be provided for securing the base 10 into the ground G to assure that the decoy 10 does not fall over.

The decoy 10 includes a head 14 which is lifelike and a torso or body 16. A front leg 17 may surround or be an actual part of the vertical support 19 which is fixed to the base 12. Rearwardly of the body 16 is the hip portion 18. Downwardly from the hip portion 18 are suspended flexible rear legs 20 which are affixed to the hip portion 18 by a pivot joint pin 22. A tail 24 is pivotally mounted by a pivot pin 26 and normally hangs in the downward position. A tail stop 25 is provided to assure that the tail does not move upwardly to an unnatural position.

A mounting panel 27 may be within the body 16 for mounting the body posture adjustment and support means 28 and 30. The torso or body supporting means 28 suitably comprises a lever 32 which is connected by a strut 35 to the front leg pivot point 38. A gusset plate 37 may be secured to the strut 35 and the lever 32 to add structural strength to the torso supporting means 28. The body 10 supported by the supporting means 28 or lever 32 is biased into an upright horizontal position by biasing means 34 or spring 36.

The torso lowering means 30 includes a first pulley 40 suitably mounted on the base 12, a second pulley 42 suitably mounted at the lever end 44 and an idler pulley or spindle 46 suitably mounted on the mounting panel 27. An axle 47 may pass therethrough for further support and the mounting of the skin 11 and foam 13. A cable 48 extends remotely to the person and passes through the first, second and third pulleys 40, 42 and 46 ending at its fixed point at the tail 24.

Another pulley may be mounted on the ground adjacent a tree wherein the hunter or observer is located in a tree stand to permit the cable 48 to be extended upwardly to the location of the hunter or observer.

In operation, the person pulls on the cable 48 which passes through the pulleys and pulls the pivotally mounted tail 24 to its upwardly and outwardly position which simulates the female wild game's receptiveness to breeding. Further pulling of the cable will result in the lowering of the hip rear portion 18 against the biasing of spring 36. Releasing the cable 48 will permit the spring 36 or bias means 34 to again move the body 16 into its upward and substantially horizontal position. Further release of the cable 48 will lower the tail 24.

Upon the observation of male wild game in the area, the operating person may simply pull on the cable 48 to attract the male species literally to the location immediately behind the female decoy 10.

FIG. 4 shows a second embodiment decoy 50 wherein the body posture adjustment means comprises a cylinder 60 and piston rod 62 mounted between the vertical support 19 and the lever 32 or the torso supporting means 28. Actuation of the cylinder 60 and retraction of piston rod 62, acting as the torso lowering means 28, will effect the lowering of the rear hip portion 18 of the decoy. This particular embodiment does not raise the tail 24.

Referring to FIG. 6, a third embodiment 70 is shown. In this embodiment, a motorized disk 80 is suitably mounted on vertical support 19, suitably by motor mount 82, which acts as the torso lowering means 30. A rod or link 84 is eccentrically mounted on the motorized disk 80. Actuation of the motor will effect raising and lowering of the hip rear portion. As the second embodiment, there is no movement of the tail which is advantageously shown in the first embodiment.

Referring to FIG. 5, the fourth embodiment 90 may be seen. This is essentially a two-dimensional decoy 90 having panels 95 suitably supported by pins or bolts passing through the panels 90 and apertures 33 in the lever 32 which are shown in FIG. 1. Also, the panels 95 may be supported by the tail pivot point 26 and the torso pivot point 38 above the front leg 17. FIG. 8 shows some detail of this fourth embodiment as the panels 95 are affixed as to hide the body posture adjustment means, as well as the operating mechanism for the tail 24.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A four-legged female game decoy for attracting like male game on the ground for game watching, photography and hunting, the decoy comprising:
   (a) a stiff, upright vertical support mountable to the ground comprising a front leg of the decoy and supporting the decoy off the ground;
   (b) a body pivotally mounted to the vertical support in a substantially upright horizontal posture, the body having a rear hip portion with a foldable rear leg suspended therefrom by a first pivot point and the foldable rear leg further comprising an upper portion connected to the first pivot point and a lower portion pivoting on the upper portion at a second pivot point;
   (c) a body posture adjustment means supporting the body in the substantially upright posture and adapted to lower the rear hip portion to simulate a squatting urination posture for the game decoy to attract the like male game; and
   (d) wherein the body posture adjustment means comprises biasing means urging the body into the upright posture and a remotely extending cable for pulling the rear hip portion downwardly to simulate the squatting urination posture.

2. The decoy of claim 1, further comprising a tail pivotally mounted to the rear hip portion, the tail assuming a downward hanging position and being connected to the body posture adjustment means to lift the tail into an upward horizontal position.

3. A four-legged female game decoy for attracting like male game on the ground for game watching, photography and hunting, the decoy comprising:

(a) a base attachable to the ground, a stiff, upright vertical support mountable to the base and supporting the decoy off the ground;

(b) a body pivotally mounted to the vertical support in a substantially upright horizontal posture, the body having a rear hip portion;

(c) a body posture adjustment means supporting the body in the substantially upright posture and adapted to lower the rear hip portion to simulate a squatting urination posture for the game decoy to attract the like male game, wherein the body posture adjustment means comprises biasing means urging the body into the upright posture and a remotely extending cable for pulling the rear hip portion downwardly to simulate the squatting urination posture and further comprising a first pulley attached to the base and a second pulley attached to the rear hip portion, the cable passing through the first pulley and second pulley; and (d) a foldable rear leg suspended from the rear hip portion of the body.

4. The decoy of claim 1, wherein the vertical support comprises a front leg of the decoy.

5. The decoy of claim 3, further comprising a tail pivotally mounted to the rear hip portion, the tail assuming a downward hanging position and being connected to the body posture adjustment means to lift the tail into an upward horizontal position.

6. A four-legged female game decoy for attracting like male game on the ground for game watching, photography and hunting, the decoy comprising:

(a) a base attachable to the ground, a stiff, upright vertical support mountable to the base and supporting the decoy off the ground;

(b) a body pivotally mounted to the vertical support in a substantially upright horizontal posture, the body having a rear hip portion with a foldable rear leg suspended therefrom by a first pivot point and the foldable rear leg further comprising an upper portion connected to the first pivot point and a lower portion pivoting on the upper portion at a second pivot point;

(c) a body posture adjustment means with a biasing means supporting the body in the substantially upright posture and with a body rear hip portion lowering means adapted to lower the rear hip portion to simulate a squatting urination posture for the game decoy to attract the like male game, wherein the body posture adjustment means comprises biasing means urging the body into the upright posture and the body rear hip portion lowering means comprising a remotely extending cable for pulling the rear hip portion downwardly to simulate the squatting urination posture and further comprising a first pulley attached to the base and a second pulley attached to the rear hip portion, the cable passing through the first pulley and second pulley.

7. The decoy of claim 6, further comprising a tail pivotally mounted to the rear hip portion, the tail assuming a downward hanging position and being connected to the body posture adjustment means to lift the tail into an upward horizontal position.

\* \* \* \* \*

UNITED STATES PATENT AND TRADEMARK OFFICE
CERTIFICATE OF CORRECTION

PATENT NO. : 6,021,594
DATED : February 8, 2000
INVENTOR(S) : Wayne C. Krueger

It is certified that error appears in the above-identified patent and that said Letters Patent is hereby corrected as shown below:

<u>Columns 4, 5, and 6, claims 1-7,</u>
Should read as follows:
1. A four-legged female game decoy for attracting like male game on the ground for game watching, photography and hunting, the decoy comprising:

(a) a base attachable to the ground, a stiff, upright vertical support mountable to the base and supporting the decoy off the ground;

(b) a body pivotally mounted to the vertical support in a substantially upright horizontal posture, the body having a rear hip portion;

(c) a body posture adjustment means supporting the body in the substantially upright posture and adapted to lower the rear hip portion to simulate a squatting urination posture for the game decoy to attract the like male game, wherein the body posture adjustment means comprises biasing means urging the body into the upright posture and a remotely extending cable for pulling the rear hip portion downwardly to simulate the squatting urination posture and further comprising a first pulley attached to the base and a second pulley attached to the rear hip portion, the cable passing through the first pulley and second pulley; and (d) a foldable rear leg suspended from the rear hip portion of the body.

2. The decoy of claim 1, wherein the vertical support comprises a front leg of the decoy.

3. The decoy of claim 1, further comprising a tail pivotally mounted to the rear hip portion, the tail assuming a downward hanging position and being connected to the body posture adjustment means to lift the tail into an upward horizontal position.

4. A four-legged female game decoy for attracting like male game on the ground for game watching, photography and hunting, the decoy comprising:

(a) a stiff, upright vertical support mountable to the ground comprising a front leg of the decoy and supporting the decoy off the ground;

UNITED STATES PATENT AND TRADEMARK OFFICE
CERTIFICATE OF CORRECTION

PATENT NO. : 6,021,594
DATED : February 8, 2000
INVENTOR(S) : Wayne C. Krueger

It is certified that error appears in the above-identified patent and that said Letters Patent is hereby corrected as shown below:

(b) a body pivotally mounted to the vertical support in a substantially upright horizontal posture, the body having a rear hip portion with a foldable rear leg suspended therefrom by a first pivot point and the foldable rear leg further comprising an upper portion connected to the first pivot point and a lower portion pivoting on the upper portion at a second pivot point;

(c) a body posture adjustment means supporting the body in the substantially upright posture and adapted to lower the rear hip portion to simulate a squatting urination posture for the game decoy to attract the like male game; and (d) wherein the body posture adjustment means comprises biasing means urging the body into the upright posture and a remotely extending cable for pulling the rear hip portion downwardly to simulate the squatting urination posture.

5. The decoy of claim 4, further comprising a tail pivotally mounted to the rear hip portion, the tail assuming a downward hanging position and being connected to the body posture adjustment means to lift the tail into an upward horizontal position.

6. A four-legged female game decoy for attracting like male game on the ground for game watching, photography and hunting, the decoy comprising:

(a) a base attachable to the ground, a stiff, upright vertical support mountable to the base and supporting the decoy off the ground;

(b) a body pivotally mounted to the vertical support in a substantially upright horizontal posture, the body having a rear hip portion with a foldable rear leg suspended therefrom by a first pivot point and the foldable rear leg further comprising an upper portion connected to the first pivot point and a lower portion pivoting on the upper portion at a second pivot point;

UNITED STATES PATENT AND TRADEMARK OFFICE
CERTIFICATE OF CORRECTION

PATENT NO. : 6,021,594
DATED : February 8, 2000
INVENTOR(S) : Wayne C. Krueger

It is certified that error appears in the above-identified patent and that said Letters Patent is hereby corrected as shown below:

(c) a body posture adjustment means supporting the body in the substantially upright posture and with a body rear hip portion lowering means adapted to lower the rear hip portion to simulate a squatting urination posture for the game decoy to attract the like male game, wherein the body posture adjustment means comprises biasing means urging the body into the upright posture and the body rear hip portion lowering means comprising a remotely extending cable for pulling the rear hip portion downwardly to simulate the squatting urinzation posture and further comprising a first pulley attached to the base and a second pulley attached to the rear hip portion, the cable passing through the first pulley and second pulley.

7. The decoy of claim 6, further comprising a tail pivotally mounted to the rear hip portion, the tail assuming a downward hanging position and being connected to the body posture adjustment means to lift the tail into an upward horizontal position.

Signed and Sealed this

Twenty-ninth Day of January, 2002

*Attest:*

*Attesting Officer*

JAMES E. ROGAN
*Director of the United States Patent and Trademark Office*